United States Patent
Li et al.

(10) Patent No.: US 11,636,120 B2
(45) Date of Patent: Apr. 25, 2023

(54) OFFLINE EVALUATION OF RANKING FUNCTIONS

(71) Applicant: Microsoft Corporation, Redmond, WA (US)

(72) Inventors: Lihong Li, Redmond, WA (US); Jinyoung Kim, Bellevue, WA (US); Imed Zitouni, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1038 days.

(21) Appl. No.: 14/550,640

(22) Filed: Nov. 21, 2014

(65) Prior Publication Data

US 2016/0147754 A1 May 26, 2016

(51) Int. Cl.
*G06F 16/2457* (2019.01)
*G06Q 30/02* (2012.01)
(Continued)

(52) U.S. Cl.
CPC ....... *G06F 16/24578* (2019.01); *G06Q 30/00* (2013.01); *G06Q 30/02* (2013.01); *H04L 67/02* (2013.01)

(58) Field of Classification Search
CPC .... G06F 17/3053; G06Q 30/00; G06Q 30/02; H04L 67/02
See application file for complete search history.

(56) References Cited

U.S. PATENT DOCUMENTS 7,779,019 B2    8/2010   Burges
8,060,456 B2   11/2011   Gao et al.
(Continued)

FOREIGN PATENT DOCUMENTS

CN    1963816 A      5/2007
CN  101079824 A     11/2007
(Continued)

OTHER PUBLICATIONS

Gunawardana et al. A Survey of Accuracy Evaluation Metrics of Recommendation Tasks. Journal of Machine Learning Research 10(2009) 2935-2962. [retrieved on Dec. 2009]. Retrieved from the Internet <URL: http://jmlr.csail.mit.edu/papers/volume10/gunawardana09a/gunawardana09a.pdf>.*

(Continued)

*Primary Examiner* — Apu M Mofiz
*Assistant Examiner* — Husam Turki Samara
(74) *Attorney, Agent, or Firm* — International IP Law Group, PLLC (57) ABSTRACT

The claimed subject matter includes techniques for offline evaluation of ranking functions. An example system includes a first module configured to receive production log data, the first module to pre-process the production log data to generate an exploration data set. The example system also includes a second module configured to perform offline estimation of online metrics for ranking functions using the exploration data set. The example system also includes a third module to evaluate a proposed ranking function by comparing the estimated online metrics to a set of baseline metrics of a baseline ranking function and detecting that the estimated online metrics of the proposed ranking function exceed, are lower than, or are within a predetermined range of the baseline metrics.

20 Claims, 4 Drawing Sheets

(51) Int. Cl.
  *G06Q 30/00* (2012.01)
  *H04L 67/02* (2022.01)

(56) References Cited

U.S. PATENT DOCUMENTS

| | | | |
|---|---|---|---|
| 8,332,411 B2 | 12/2012 | Burges et al. | |
| 8,515,950 B2 | 8/2013 | Gao et al. | |
| 2007/0294225 A1* | 12/2007 | Radlinski | G06F 17/30867 |
| 2009/0083248 A1 | 3/2009 | Lu et al. | |
| 2009/0265290 A1* | 10/2009 | Ciaramita | G06Q 30/02 706/12 |
| 2010/0153215 A1* | 6/2010 | Abraham | G06Q 30/02 705/14.55 |
| 2010/0185623 A1 | 7/2010 | Liu et al. | |
| 2011/0184883 A1* | 7/2011 | El-Charif | G06Q 30/02 705/348 |
| 2011/0231246 A1 | 9/2011 | Bhatia et al. | |
| 2012/0016642 A1* | 1/2012 | Li | G06Q 30/02 703/2 |
| 2012/0030152 A1* | 2/2012 | Pueyo | G06F 17/30867 706/12 |
| 2012/0117058 A1 | 5/2012 | Rubinstein et al. | |
| 2012/0150854 A1 | 6/2012 | Song et al. | |
| 2012/0197905 A1 | 8/2012 | Kumar et al. | |
| 2013/0019210 A1 | 1/2013 | Priestly et al. | |
| 2013/0198186 A1 | 8/2013 | Parakhin et al. | |
| 2016/0019219 A1* | 1/2016 | Serdyukov | G06F 16/9535 707/723 |

FOREIGN PATENT DOCUMENTS

| | | |
|---|---|---|
| CN | 102073726 A | 5/2011 |
| CN | 102138291 A | 7/2011 |
| CN | 103235796 A | 8/2013 |
| JP | 2006528383 A | 12/2006 |
| JP | 2010282402 A | 12/2010 |
| JP | 2011059947 A | 3/2011 |
| JP | 2011100302 A | 5/2011 |
| WO | 2005008526 A1 | 1/2005 |
| WO | 2009095355 A2 | 8/2009 |
| WO | 2010072652 A1 | 7/2010 |

OTHER PUBLICATIONS

Written Opinion of the International Preliminary Examining Authority for PCT Application No. PCT/US2015/059362, dated Oct. 10, 2016, 5 pages.
Efthimiadis, Efthimis N., User Choices: A New Yardstick for the Evaluation of Ranking Algorithms for Inetractive Query Expansion, Information Processing & Management, 1995, pp. 605-620, vol. 31, No. 4, Great Britain.
"International Search Report & Written Opinion for PCT Patent Application No. PCT/US2015/059362", dated Dec. 21, 2015, Filed Date: Nov. 6, 2015, 12 Pages.
Adali et al., "The Impact of Ranker Quality on Rank Aggregation Algorithms: Information vs. Robustness", In Proceedings of the 22nd International Conference on Data Engineering Workshops, Apr. 3, 2006, 10 pages.
Baeza-Yates et al., "Modern Information Retrieval", In ACM Press, May 1999, 103 pages.
Balasubramanian, et al., "Cost-Effective Combination of Multiple Rankers: Learning When Not To Query", In Proceedings of Fourth North East Student Colloquium on Artificial Intelligence, Apr. 16, 2010, 8 pages.
Belkin, Nicholas J., "Some(what) Grand Challenges for Information Retrieval", In Newsletter of ACM SIGIR Forum vol. 42, Issue 1, Jun. 2008, 8 pages.
Bottou et al., "Counterfactual Reasoning and Learning Systems: the Example of Computational Advertising", In Journal of Machine Learning Research vol. 14, Issue 1, Jan. 2013, 54 pages.

Burges et al., "Learning to Rank Using Gradient Descent", In Proceedings of the 22nd International Conference on Machine Learning, Aug. 7, 2005, 8 pages.
Buscher et al., "Segment-level Display Time as Implicit Feedback: a Comparison to Eye Tracking", In Proceedings of the 32nd International ACM SIGIR Conference on Research and Development in Information Retrieval, Jul. 19, 2009, 8 pages.
Chapelle, et al., "Large-scale Validation and Analysis of Interleaved Search Evaluation", In Journal of ACM Transactions on Information Systems, vol. 30, Issue 1, Feb. 2012, 41 pages.
Jarvelin et al., "Cumulated Gain-based Evaluation of IR Techniques", In Journal of ACM Transactions on Information Systems, vol. 20, Issue 4, Oct. 2002, 25 pages.
Kazai et al., "Dissimilarity Based Query Selection for Efficient Preference Based IR Evaluation", In Proceedings of the 36th European Conference on IR Research, Apr. 13, 2004, 6 pages.
Kohavi et al., "Controlled Experiments on the Web: Survey and Practical Guide", In Journal of Data Mining and Knowledge Discovery vol. 18, Issue 1, Jul. 30, 2008, 42 pages.
Lambertsu et al., "More Bang for Their Bucks: Assessing New Features for Online Advertisers" In Proceedings of ACM SIGKDD Explorations Newsletter Special Issue on Visual Analytics vol. 9, Issue 2, 8 pages.
Langford et al., "Exploration Scavenging", In Proceedings of the 25th International Conference on Machine Learning, Jul. 5, 2008, 8 pages.
Li et al., "On Minimax Optional Off-Policy Policy Evaluation", In Artificial Intelligence Computer Science, Sep. 12, 2014, 15 pages.
Li et al., "Unbiased Offline Evaluation of Contextual-Bandit-Based News Article Recommendation Algorithms", In Proceedings of the fourth ACM international conference on Web search and data mining, Feb. 9, 2011, 10 pages.
Maurer, et al., "Empirical Bernstein Bounds and Sample Variance Penalization", In Conference on Learning Theory, Jun. 18, 2009, 9 pages.
Radlinski et al., "Comparing the Sensitivity of Information Retrieval Metrics", In Proceedings of the 33rd international ACM SIGIR conference on Research and development in information retrieval, Jul. 19, 2010, 8 pages.
Robertson, Stephen, "On the History of Evaluation in IR", In Journal of Information Science, vol. 34, Issue 4, Aug. 2008, 19 pages.
Strehl et al., "Learning from Logged Implicit Exploration Data", In Proceedings of Advances in Neural Information Processing Systems, Retrieved on: Nov. 12, 2014, 9 pages.
Tan et al., "Applying Co-training to Clickthrough Data for Search Engine Adaptation?", In Proceedings of the 9th International Conference on Database Systems for Advanced Applications, Mar. 17, 2004, 12 pages.
Tang, et al., "Automatic AD Format Selection via Contextual Bandits", In Proceedings of the 22nd ACM International Conference on Conference on Information & Knowledge Management, Oct. 27, 2013, 8 pages.
Turpin, et al., "Why Batch and User Evaluations Do not give the Same Results", In Proceedings of the 24th Annual International ACM SIGIR Conference on Research and Development in Information Retrieval, Sep. 1, 2001, 7 pages.
Zheng, et al., "A General Boosting Method and its Application to Learning Ranking Functions for Web Search", In Advances in Neural Information Processing Systems, Dec. 8, 2008, 8 pages.
International Preliminary Report on Patentability, for PCT Application No. PCT/US2015/059362, dated Jan. 13, 2017, 14 pages.
"Office Action Issued in Japanese Patent Application No. 2017-523986", dated Aug. 23, 2019, 8 Pages.
Hijikata, Yoshinori, "Offline Evaluation for Recommender Systems", In Journal of Japanese Society for Artificial Intelligence, vol. 29, Issue 6, Nov. 1, 2014, pp. 658-689.
"Summons to Attend Oral Proceedings Issued in European Patent Application No. 15794786.2", Mailed Date: Mar. 4, 2020, 9 Pages.
"Office Action and Search Report Issued in Chinese Patent Application No. 201580063142.5", dated May 6, 2020, 20 Pages.
"Summons to Attend Oral Proceedings Issued in European Patent Application No. 15794786.2", Mailed Date: May 8, 2020, 11 Pages.

(56) References Cited

OTHER PUBLICATIONS

"Office Action Issued in Chinese Patent Application No. 201580063142.5", dated Nov. 16, 2020, 11 Pages.
"Office Action Issued in Indian Patent Application No. 201747014858", dated Mar. 11, 2021, 7 Pages.
Office Issued in Chinese Patent Application No. 201580063142.5, dated Apr. 6, 2021, 8 Pages.

* cited by examiner

OFFLINE EVALUATION OF RANKING FUNCTIONS

BACKGROUND

Information retrieval (IR) systems use ranking functions, also known as rankers, to sort search results in response to queries from users. Ranking functions can also be used in recommending order lists of items to be purchased. Online A/B testing of ranking functions, also known as A/B flighting or simply flighting, can be used to measure online relevance metrics and compare two or more ranking functions. A/B refers to the two ranking functions, A and B, to be compared, although more than two ranking functions may be compared in a similar way.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An implementation provides a system for offline evaluation of ranking functions. The system includes a processor and a system memory including code to direct the processor. When executed this code can cause the processor to receive production log data, the processor to pre-process the production log data to generate an exploration data set. The code can also cause the processor to perform offline estimation of online metrics for ranking functions using the exploration data set. The code can also cause the processor to evaluate the proposed ranking function by comparing the estimated online metrics to a set of baseline metrics of a baseline ranking function and detecting that the estimated online metrics of the proposed ranking function exceed, are lower than, or are within a predetermined range of the baseline metrics.

Another implementation provides method for offline evaluation of ranking function performance. The method can include receiving production log data. The method can also include pre-processing the production log data to generate an exploration data set. The method can further include performing an offline estimation of online metrics using the exploration data set for a plurality of ranking functions. The method can also further include comparing the plurality of ranking functions based on the estimated online metrics to generate comparison results. The method can also include identifying one or more preferred ranking functions based on the comparison results. The method can also further include generating query results with the preferred ranking function during a testing process.

Another implementation provides one or more computer-readable storage medium for storing computer readable instructions that, when executed by one or more processing devices, instruct the offline evaluation of ranking function performance. The computer-readable medium includes instructions to receive production log data. The computer-readable medium also includes instructions to preprocess the production log data to generate an exploration data set. The computer-readable medium includes instructions to perform offline estimates of online metrics for a ranking function based at least in part on the exploration data set and an approximate action matching process. Further, the computer-readable medium includes instructions to detect that the ranking function is a preferred ranking function based on a comparison of the estimated online metrics with baseline ranking function metrics. The computer-readable medium also further includes instructions to execute an action on an information retrieval system based on the preferred ranking function in response to detecting that a quality of the preferred ranking function exceeds a threshold during a testing process.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Ranking functions can be evaluated using various techniques. As discussed above, a ranking function can be used to rank results of a query in an information retrieval system. An information retrieval system obtains information resources relevant to an information need from a collection of information resources. For example, the information resources can be search engine results or product recommendations. In some examples, ranking functions can be evaluated for relevance accuracy while offline using a randomized data collection flight. A flight, as used herein, refers to an online experiment that runs the ranker to serve users for a period of time, and then measures relevance quality metrics in this time period. In order to evaluate an IR system without running it on users (which is referred to as "offline evaluation" in this document), existing approaches collect randomized data in the following way for a user-submitted query: compute a number of possible permutations of results, randomly select one of the permutations, show it to the user, and measure a relevance score (which depends on user reaction to the perceived permutation). However, there are too many permutations, which makes the above randomized data collection procedure costly.

This disclosure describes techniques to evaluate ranking functions through predicting the average metric value of a ranking function using historical log data, without the expensive randomized data collection step. In some examples, historical log data, such as production log data from one or more search engines, can include a plurality of queries and query results or actions, such as search engine results pages (SERPs). An action, as used herein, refers to organizing and displaying data in a particular manner in response to a query. For example, an action can include a SERP or recommendation list, among other responses. A metric value, as used herein, refers to a value assigned to a ranking function based on performance characteristics. In some examples, performance characteristics can be defined based on various goals. For example, the performance characteristics can represent positive user feedback regarding results returned by a ranking function, and a quality of the results returned by a ranking function, among others. The metric value can indicate a ranking function's performance or quality as a ratio for a given performance characteristic. In examples, one or more of these performance characteristics may be used to evaluate ranking functions.

In some embodiments, the historical log data used to predict a metric value can be a simulated randomized data collection from production log data by taking advantage of result diversity and causal inference techniques, which are discussed in greater detail below. In some examples, the present techniques also provide for a near-unbiased offline evaluation of ranking functions. The present techniques can be used to identify ranking functions for live testing such that the total number of ranking functions to be tested online can be reduced. Thus, ranking functions can be evaluated before testing the ranking functions on users. The techniques thus reduce the likelihood of a user spending more time and thus more resources in locating information or a product. The techniques also reduce the number of interactions required by users to identify more efficient ranking functions. Moreover, the increased efficiency of the ranking functions can further save computer resources by enabling a user to find products or information using fewer resources. In addition, network bandwidth is saved by reducing the number of ranking functions to be tested online. These techniques are described in more detail below.

Figure 1:
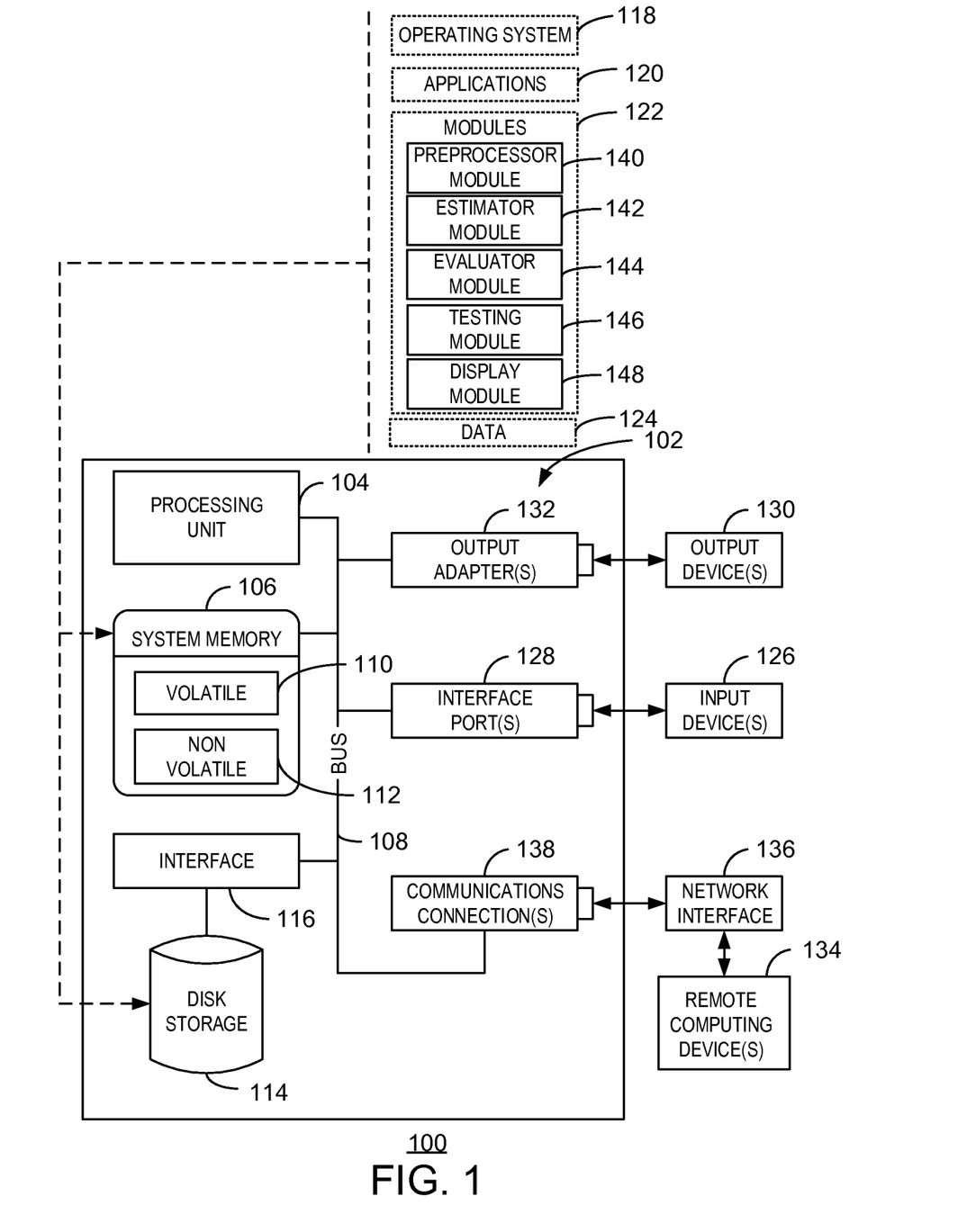
FIG. 1 is a block diagram of an example operating environment configured for implementing various aspects of the techniques described herein.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media include magnetic storage devices, e.g., hard disk, floppy disk, magnetic strips, optical disk, compact disk (CD), digital versatile disk (DVD), smart cards, flash memory devices, among others. Moreover, computer-readable storage media does not include communication media such as transmission media for wireless signals. In contrast, computer-readable media, i.e., not storage media, may include communication media such as transmission media for wireless signals.

FIG. 1 is intended to provide a brief, general description of a computing environment in which the various techniques described herein may be implemented. For example, a method and system for offline evaluation of ranking functions described in FIGS. 2 and 3 can be implemented in such a computing environment. While the claimed subject matter is described below in the general context of computer-executable instructions of a computer program that runs on a local computer or remote computer, the claimed subject matter also may be implemented in combination with other program modules. Generally, program modules include routines, programs, components, data structures, or the like that perform particular tasks or implement particular abstract data types.

FIG. 1 is a block diagram of an example operating environment configured for implementing various aspects of the techniques described herein. The example operating environment 100 includes a computer 102. The computer 102 includes a processing unit 104, a system memory 106, and a system bus 108.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/non-volatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the claimed subject matter can be implemented with various operating systems or combinations of operating systems.

A user enters commands or information into the computer 102 through input devices 132. Input devices 132 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. The input devices 132 connect to the processing unit 604 through the system bus 108 via interface ports 134. Interface ports 134 include, for example, a serial port, a parallel port, a game port, and a universal serial bus (USB).

Output devices 136 use some of the same type of ports as input devices 132. Thus, for example, a USB port may be used to provide input to the computer 102, and to output information from computer 102 to an output device 136.

Output adapter 138 is provided to illustrate that there are some output devices 130 like monitors, speakers, and printers, among other output devices 136, which are accessible via adapters. The output adapters 138 include, by way of illustration and not limitation, video and sound cards that provide a means of connection between the output device 136 and the system bus 108. It can be noted that other devices and systems of devices provide both input and output capabilities such as remote computers 140.

The computer 102 can be a server hosting various software applications in a networked environment using logical connections to one or more remote computers, such as remote computers 134. The remote computers 134 may be client systems configured with web browsers, PC applications, mobile phone applications, and the like. The remote computers 134 can be a personal computer, a server, a router, a network PC, a workstation, a microprocessor based appliance, a mobile phone, a peer device or other common network node and the like, and typically includes many or all of the elements described relative to the computer 102.

Remote computers 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

An example processing unit 104 for the server may be a computing cluster. Additionally, the disk storage 114 can store various types of data 124 used to evaluate ranking functions. For example, the disk storage 114 may comprise an enterprise data storage system, for example, storing data 124 such as impressions. An impression, as used herein, refers to an instance of an action by a particular ranking function in response to a particular query from a user. For example, an action can be a SERP in response to a query to a search engine Impressions can be used to estimate online metrics for proposed ranking functions as discussed in detail in FIG. 3 below. The data 124 can also include one or more production logs, which may be obtained or constructed from information obtained from search engine queries and search engine results pages (SERPs), for example. In some examples, the production log data 124 can be obtained from one or more search engines.

One or more modules 122 can be configured to perform offline evaluation of ranking functions. For example, the ranking functions may be a set of proposed ranking functions to eventually be tested online and potentially replace an existing ranking function of a search engine or recommendation service. The proposed ranking functions may be provided by a developer or generated by a machine. In implementations, a preprocessor module 140 can generate exploration data from the production log data. Exploration data is data that is used to simulate randomized data used by existing approaches to offline evaluation of proposed ranking functions. Production log data displays a substantial amount of diversity; that is, for the same query issued by the same user in different impressions, the IR system might take different actions, due to constant updates of the system or other streaming information the system takes. Such diversified actions for the same user-query pair are treated as randomized. In some examples, the preprocessor module 140 can use diversity in ranking function behavior to simulate randomized data collection when generating the exploration data set. In some examples, the preprocessor module 140 can aggregate the production log data by query, by action, by probability of action and by reward value. In implementations, an estimator module 142 can perform offline estimation of online metrics for ranking functions using the exploration data set. In some examples, the estimator module 142 can use approximate action matching of rankings to estimate online metrics. The online metrics may include any reward signal derived from user response to the system action, such as a click-through rate (CTR), a time to click on a search engine results page (SERP), and a mean reciprocal of click positions. In implementations, an evaluator module 144 can evaluate the proposed ranking function by comparing the estimated online metrics to a set of baseline metrics of a baseline ranking function. A baseline ranking function, as used herein, refers to a ranking function that can be an IR system currently in use, and in general any IR system that can serve as an alternative to the one being tested. In some examples, the evaluator module 144 can detect that the estimated online metrics of the proposed ranking function exceed, are lower than, or are within a predetermined range of the baseline metrics. The testing module 146 can then generate query results with the proposed ranking function as a test of the proposed ranking function. In some examples, the testing module 146 then tests the proposed ranking function online on actual users. In some examples, the preferred ranking function may be used to execute actions on an information retrieval system in response to detecting that a quality of the preferred ranking function exceeds a threshold during the testing process. For example, the actions can include displaying SERPs in response to queries. The display module 148 can display the generated query results.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). Furthermore, any of the functionalities of the preprocessor module 140, the estimator module 142, the estimator module 144, and the testing module 146, can be partially, or entirely, implemented in hardware and/or in a processor. For example, the functionality can be implemented with an application specific integrated circuit, in logic implemented in the processor, or in any other device. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs), etc.

Figure 2:
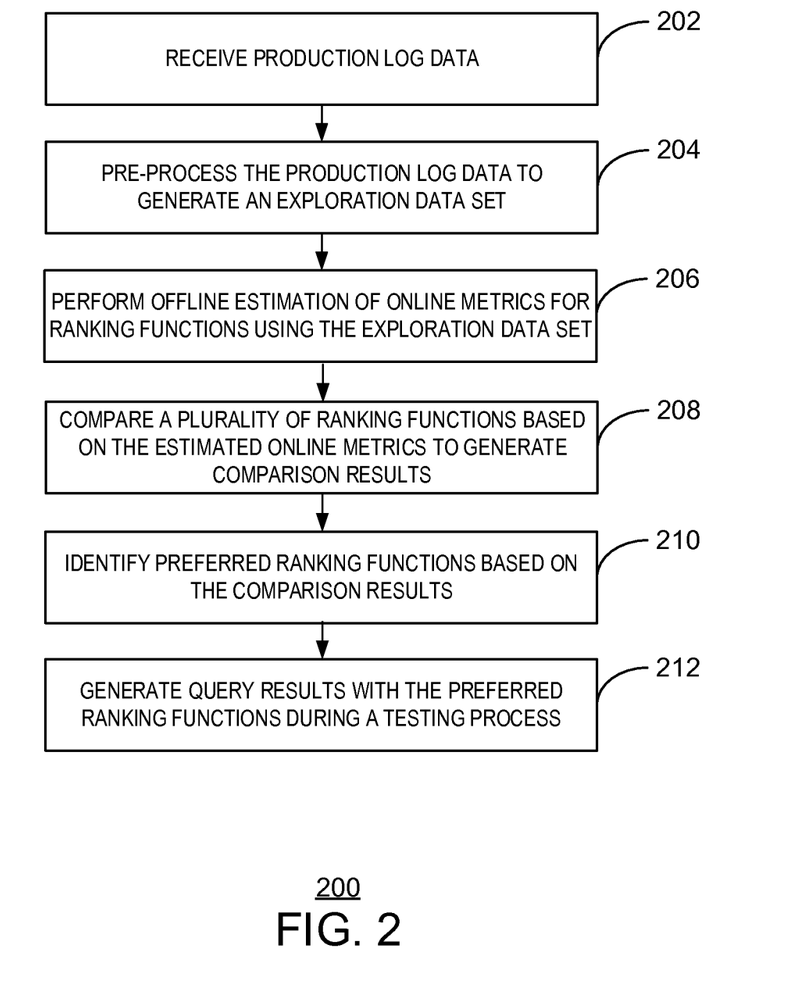
FIG. 2 shows a process flow diagram of a method for evaluating information retrieval ranking functions offline.

FIG. 2 shows a process flow diagram of a method for evaluating ranking functions offline. The method is generally referred to by the reference number 200 and discussed with reference to example system 100. At block 202, the preprocessor module 140 receives production log data. For example, the production log data can be historical data that was logged during the operation of one or more search engines and/or recommendation engines, among other services. Production log data can include, for example, user clicks, times between user clicks, SERPS, and ranking function behavior for similar queries, in different flights, and/or over different time periods.

At block 204, the preprocessor module 140 preprocesses the production log data to generate an exploration data set. An exploration data set is a processed set of data used to simulate online flighting. In some examples, preprocessing the production log data includes aggregating the production log data by query, by action, by user, by probability of action and by reward value. For example, a query can be a request for information using one or more keywords. An action can include a response to a query, such as a SERP or any other list ordered by a ranking function. A reward value can be measured by any form of online metric discussed above. In some examples, preprocessing the production log data includes using result diversity to simulate randomized data collection. Rather than using random sampling to create a set of queries to be used as the exploration data set, the preprocessor module 140 can use the diversity of the production log data to simulate randomized data collection. For example, the result diversity may be a result of search engine operation or recommendation service operation, among others.

At block 206, the estimator module 142 performs offline estimation of online metrics for ranking functions using the exploration data set. For example, a set of proposed ranking functions may be received from a developer and tested offline prior to being tested online on users. The ranking functions may be one of several ranking functions to be used by a search engine or recommendation service to rank information based on input such as a query or purchase. In some examples, the proposed ranking functions may be machine generated and automatically tested using the present techniques. The ranking functions can have flights simulated in the exploration data set that is generated from the production log data. Given a particular ranking function and exploration data set, online metrics can then be estimated by matching actions approximately in the exploration data set. Actions, as described above, can include any organized list of information in response to a query. As discussed above, the online metrics can include at least one of a click-through rate (CTR), a time to click on a search engine results page (SERP), and a mean reciprocal of click positions. In some examples, approximating matching of SERPs can be executed using a comparison of a predetermined number of higher-ranked results for each action. For example, the higher three results in a SERP as organized by a ranking function can be used to match two or more SERPS having the same three ordered results at the top of each SERP. An underlying assumption is that online metrics between similar actions such as SERPs should be roughly the same as users would response in a similar manner. In some examples, a rankDiff technique can be used to match two or more SERPs. For example, given a function sim(a, b)=1−RankDiff(a, b) that measures the similarity of two actions a and b, an example rankDiff can be calculated using the equation described in FIG. 3 below. These techniques are discussed in greater length with reference to FIG. 3 below.

At block 208, the evaluator module 144 compares a plurality of ranking functions based on the estimated online metrics to generate comparison results. For example, the comparison results may indicate that some ranking functions have higher online metric scores than others or that two or more ranking functions have online metric scores within a predetermined threshold range relative to a particular ranking function. In some examples, one of the ranking functions may be a baseline ranking function for purposes of the comparison. For example, a baseline ranking function may be a ranking function currently used by a search engine or recommendation service, and the like.

At block 210, the evaluator module 144 identifies preferred ranking functions based on the comparison results. In some examples, a first ranking function may have a higher detected relevance score as compared to a second ranking function. The first ranking function can be identified as a preferred ranking function. In some examples, the second ranking function may be a baseline ranking function. For example, the baseline ranking function may be used to compare against the rest of the proposed ranking functions. Proposed functions with estimate online metrics indicating a better performance than the baseline function may be identified as preferred ranking functions. In some examples, the evaluator module 144 detects that the estimated online metrics of the proposed ranking function exceed, are lower than, or are within a predetermined range of the baseline metrics. Thus, the proposed ranking function can be identified as a preferred function to be further tested. In some examples, a threshold confidence score may also be used to filter out ranking functions from preferred ranking function to be tested online.

At block 212, the testing module 146 generates query results with the preferred ranking functions during a testing process. For example, the testing module 146 tests the preferred ranking functions online. In some examples, the evaluator module 144 sends the preferred ranking functions to a server for online testing. For example, online A/B tests can be performed on a server using the preferred ranking function. In some examples, a confidence score that indicates a level of certainty that a quality of a ranking function exceeds a threshold can also be calculated.

This process flow diagram is not intended to indicate that the blocks of the method 200 are to be executed in any particular order, or that all of the blocks are to be included in every case. Further, any number of additional blocks not shown may be included within the method 200, depending on the details of the specific implementation.

Figure 3:
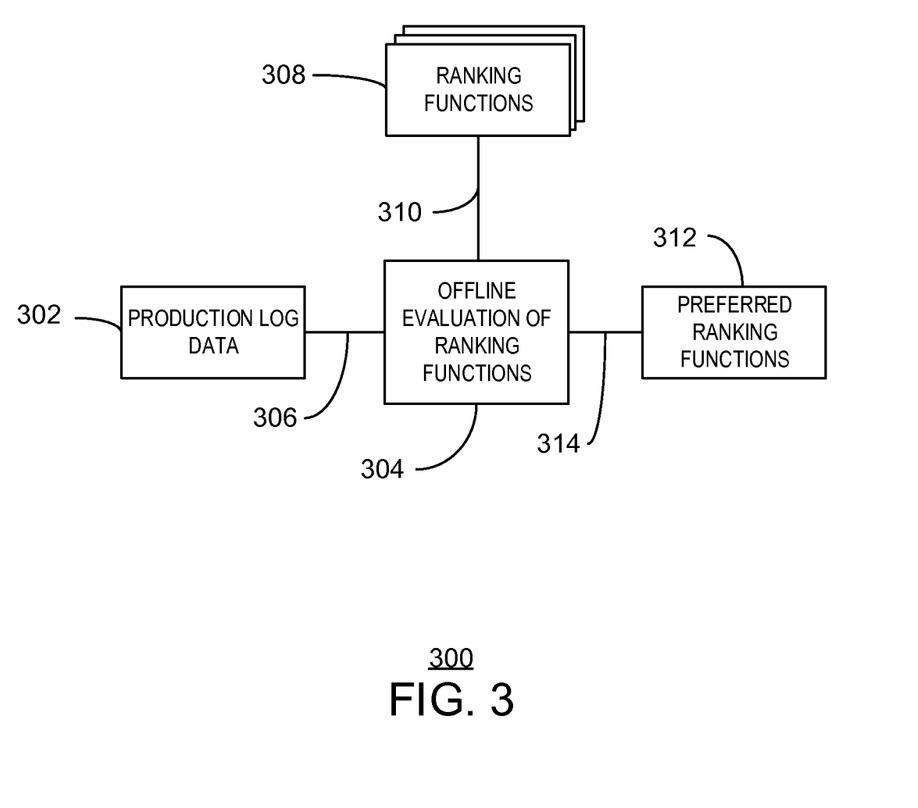
FIG. 3 is a block diagram of an example system for offline evaluation of information retrieval ranking functions.

FIG. 3 is a block diagram of an example system 300 for offline evaluation of information retrieval ranking functions. The example system 300 can be implemented using the computer 102 and is discussed with reference to the process flow diagram of FIG. 2. The example system 300 can include a production log data 302 that may be used as an input 306 for offline evaluation of ranking functions 304. The example system 300 can also include a plurality of ranking function functions 308 that can also be used as input 310 for offline evaluation of ranking functions 304. The offline evaluation of ranking functions 304 can output 314 a preferred ranking function 312 using techniques described herein.

In the example of FIG. 3, the production log data 302 can be received 202 from any source of historical data such as search engines or recommendation engines. The historical data can include ranking function actions and online metrics in response to queries or purchases. For example, the production log data 302 can be obtained from logs created during the operation of ranking functions used by search engines, recommendation engines, etc. Production log data 302 can include ranking function behavior for similar queries, in different flights, and/or over different time periods. The ranking function behavior stored in the product log data may include continuous updates of the ranking functions, changing features of query-document pairs, and updates of the engines' indexes, etc. In some examples, the result diversity from the ranking behavior and query history can be used to simulate randomized data collection when generating the exploration data set. In some examples, the production log data is aggregated by query, by action, by probability of action and by reward value. An action, as used herein, refers to the product of a ranking function or online systems that serve users generally, such as a SERPs, recommendation lists, among others.

In some examples, a contextual bandit model can be used for offline evaluation of the ranking functions. In the contextual bandit model, contextual information that is independent and identically distributed (IID) is repeatedly observed. For example, the contextual information can be a set of distinct queries Q. For any q in the set Q, $\mathcal{A}_q$ can be the set of possible actions for a query q. For example, an action a within the set $\mathcal{A}_q$ can be a possible SERP for a query q. In some examples, the contextual bandit model can be used to preprocess 204 the log data to generate an exploration data set.

The example system 300 can also include ranking functions 308. The ranking functions 308 may be a set of proposed ranking functions to be potentially tested on online users. In terms of the contextual bandit model, a ranking function 308, referred to in the contextual bandit context as "π" can select a SERP a from the set $\mathcal{A}_q$ For each observation, the example system 300 can take an action and receive a randomized reward. For example, the reward can be a binary click-or-not signal as measured from user clicks. In some examples, the received reward depends on the selected action, and rewards for other actions are not observed. In an online contextual bandit model, a hypothetical interaction between a ranking function and user would proceed in a round-by-round fashion as follows: for round t, a user visits the search engine and submits a query q from Q, drawn IID from some unknown distribution D of possible user queries. The ranking function selects an action a and displays action a to the user. For example, the action can be a SERP, among others. The user then views the SERP and based on the user's feedback a numerical reward r from the set of rewards R can be computed. However, online interaction with user is expensive, therefore offline estimation 206 of online metrics can be performed instead. For example, the metric to be estimated can take the form:

$$v(\pi) := \mathbb{E}_{q \sim D, a \sim \pi(\cdot|q)}[r] = \mathbb{E}_q [\Sigma_{a \in \mathcal{A}_q} \pi(a|q) \mathbb{E}[r|q,a]] \quad (1)$$

where the metric v(π) is the average reward r obtained by executing the ranking function π on queries q encountered by a search engine. If the ranking function π is deterministic, then the online metric to be estimated can take the form:

$$v(\pi) := \mathbb{E}_{q \sim D}[r|q, \pi(q)] \quad (2)$$

A variety of types of online metrics can be used. In some examples, online metrics can be obtained by defining appropriate rewards. For example, if r is defined to be 1 if there is a click on a SERP and 0 otherwise, then v(π) can be the per-impression click-through-rate (CTR) of the ranking function. An impression, as used herein, refers to a single interaction between user and the IR system, consisting of query q, action a=π(q) taken by the ranking function π, and reward derived from user clicks, among others. For example, the action may be a SERP, a recommendation list, among other actions. In some examples, online metrics can be defined for clicks that satisfy specific desired conditions, or incorporate monetary information to measure revenue. Another type of online metric can attempt to quantify how soon a user finds information that they seek. For example, the online metric can quantify the amount of time that it takes for a user to select a hyperlink after they submit a query. In some examples, any pre-defined user action can also be timed relative to submission of a query. In implementations, the online metrics can be a fraction of successful search activities of a ranking function that depends on user feedback. A successful search activity can be configured according to the specific goals of a customer.

Still referring to FIG. 3, in implementations, offline estimations of online metrics for the proposed ranking functions 308 can be performed 206 using an exploration data set. For example, the exploration data set can be defined as a set $D=(q_i, a_i, p_i, r_i))_{1\leq i\leq n}$, wherein i indexes a distinct impression, $q_i$ is the query issued by user in that impression, $a_i$ is a ranking list, the propensity score $p_i$ is the probability of showing $a_i$ for $q_i$ in the data-collection flight, and $r_i$ is the resulting click-based metric. The estimator can use diversity in ranking function behavior for the same query, in different flights and/or over different time periods to simulate randomization, even if the individual rankings were computed deterministically in each impression. For example, such diversity can be caused by factors such as continuous updates of the ranking function, changing features of query-document pairs, constant updates of the engine's indexes, etc. The diversity of the ranking function behavior leads to a seemingly randomized behavior of the system. In some examples, the counts of query a and the query-ranking pair (q, a) observed in the exploration data can be defined by the equations:

$$n(q) := \sum_{k=1}^{n} \mathbb{I}\{q_i = q\} \tag{3}$$

$$n(q, a) := \sum_{k=1}^{n} \mathbb{I}\{q_i = q, a_i = a\} \tag{4}$$

where $\mathbb{I}\{C\}$ is a set-indicator function that evaluates to 1 if condition C holds true and 0 otherwise. In this case, a pretended randomization probability can be expressed in the form:

$$p_i = p(a_i \mid q_i) := \frac{n(q_i, a_i)}{n(q_i)} \tag{5}$$

The unbiased estimator of Equation 1 can then be expressed as:

$$\hat{v}_i(\pi) = \frac{1}{n}\sum_q n(q)\Sigma_{a\in\mathcal{A}_q}\pi(a\mid q)\hat{r}(q, a) = \sum_q \hat{\mu}(q)\Sigma_{a\in\mathcal{A}_q}\pi(a\mid q)\hat{r}(q, a) \tag{6}$$

where $\hat{\mu}(q):=n(q)/n$ is the relative frequency of q in the data set $\mathcal{D}$, and:

$$\hat{r}(q, a) := \frac{1}{n(q, a)}\sum_i \mathbb{I}\{q_i = q, a_i = a\}r_i \tag{7}$$

is the averaged reward $\hat{r}(q, a)$ for (q, a).

In some examples, approximate action matching of rankings can be used to estimate online metrics for each proposed ranking function 308. For example, for a SERP, an approximate matching may take the form of matching the top three or five search results of a ranking page. Thus, two rankings, A and B, may be considered identical if the top five results match. In some examples, the number of results to match can be predetermined and/or configurable. For example, the threshold number of results to match can be adjusted based on the number total actions to be processed and the amount of bias resulting from the approximation. In some examples, the reward estimator including ranking function approximate action matching with binary relation "~" can be expressed as:

$$\hat{v}_1(\pi) = \sum_q \hat{\mu}(q)\Sigma_{a\in\mathcal{A}_q}\frac{\sum_{a'\sim a}\pi(a'\mid q)n(q, a)\hat{r}(q, a)}{\sum_{a'\sim a}n(q, a')} \tag{8}$$

In some examples, a ranking function may be deterministic. When the ranking function is deterministic, the estimator can be simplified to:

$$\hat{v}_i(\pi) = \frac{1}{n}\sum_q n(q)\hat{r}(q, \pi(q)) \tag{9}$$

where $\pi(a)$ represents the action that deterministic ranking function $\pi$ selects for query q. In some examples, approximate action matching can be performed through the use of a rankDiff technique. For example, given a function sim(a, b)=1−RankDiff(a, b) that measures the similarity of the two actions a and b, actions may be approximately matched using the equation:

$$\hat{V}_S(\pi) = \frac{1}{|D|}\sum_{(q,a,r)\in D}\left[\frac{\sum_{(q,b,\rho)\in D}sim(a, b)\cdot\rho}{\sum_{(q,b,\rho)\in D}sim(a, b)}\right] \tag{10}$$

Additionally, variance estimates can be used to evaluate whether a difference between estimates of two ranking functions is statistically significant. In some examples, these variance estimates can be computed by:

$$\mathbb{V}(\hat{v}_1(\pi)) = \tag{11}$$

$$\frac{1}{n^2}\sum_q\sum_{a\in\mathcal{A}_q}\frac{\pi(a\mid q)^2 n(q\mid a)^2}{p(a\mid q)^2}\mathbb{V}(r(q, a)) \leq \frac{R^2}{4n^2}\sum_q\sum_{a\in\mathcal{A}_q}\frac{n_*(q, a)^2 n(q)^2}{n_*(q)^2 n(q, a)}$$

$$\mathbb{V}(\hat{v}_1(\pi)) = \frac{1}{n^2}\sum_q n(q)^2 \mathbb{V}(\hat{r}(q, \pi(q))) \leq \frac{R^2}{4n^2}\sum_q \frac{n(q)^2}{n(q, \pi(q))} \tag{12}$$

where Equation 10 is the variance estimator for the general case and Equation 11 is the variance estimator when $\pi$ is deterministic.

Still referring to FIG. 3, the proposed ranking function can be evaluated 304 by comparing 208 the estimated online metrics to a set of metrics of another ranking function 308. For example, a baseline ranking function 308 may be a ranking function currently in use by a particular search engine or recommendation service. The estimated online metrics for the proposed ranking functions 308 can be compared to the baseline ranking function 308. In some examples, if the proposed ranking function 308 has a higher metric score than the baseline ranking function, then the proposed ranking function 308 can be identified 210 as a preferred ranking function 312. Preferred ranking functions 312 may then undergo further online testing on groups of actual users. For example, traditional A/B testing may be performed using the preferred ranking functions 312. Thus, the present techniques save the resources such as processor power and bandwidth that may have otherwise been spent on testing unsuccessful ranking functions online on live users. Furthermore, the techniques reduce the risk of upsetting customers by presenting groups of users with a negative online experience.

Figure 4:
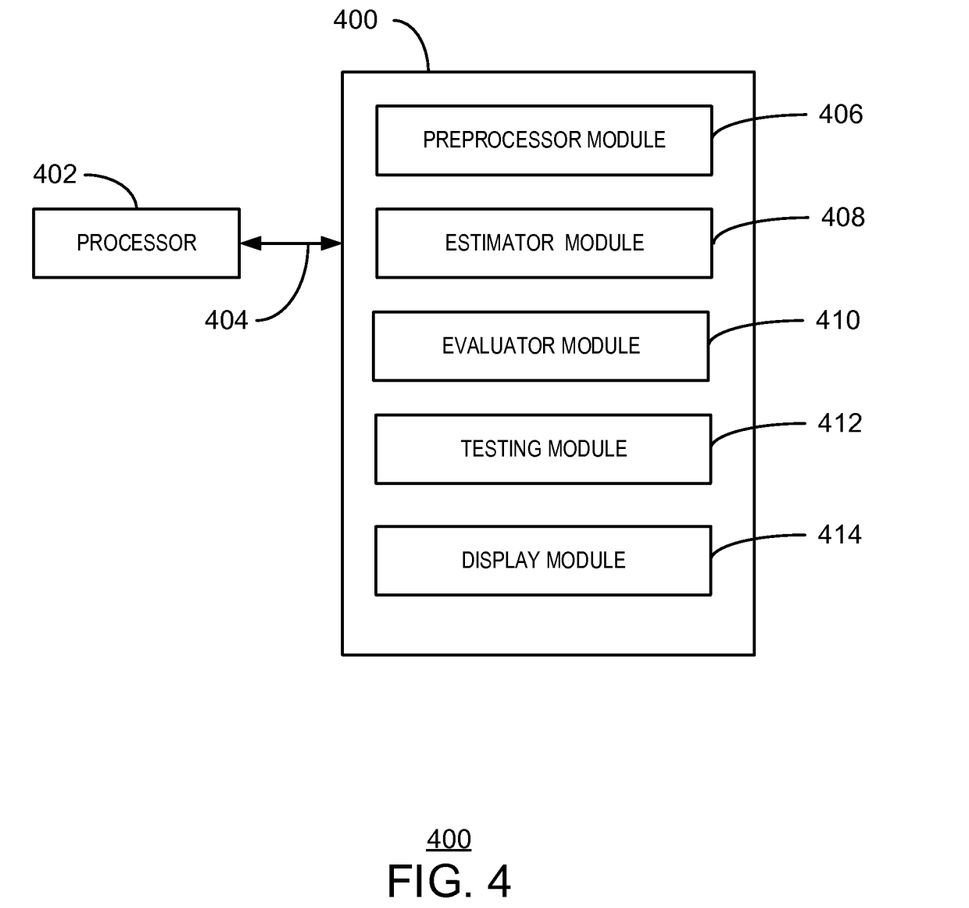
FIG. 4 is a block diagram of an exemplary computer-readable storage medium that can be used to evaluate ranking functions offline.

FIG. 4 is a block diagram showing a tangible, computer-readable storage medium that can be used to evaluate ranking functions offline. The tangible, computer-readable storage media 400 can be accessed by a processor 402 over a computer bus 404. Furthermore, the tangible, computer-readable storage media 400 can include code to direct the processor 402 to perform the current methods. For example, method 300 can be performed by the processor 402.

The various software components discussed herein can be stored on the tangible, computer-readable storage media 400, as indicated in FIG. 4. For example, the tangible computer-readable storage media 400 can include a preprocessor module 406, an estimator module 408, and an evaluator module 410. In some implementations, the preprocessor module 406 includes code to receive production log data. For example, the production log data can include continuous updates of the ranking functions, changing features of query-document pairs, and updates of engines' indexes, etc. The preprocessor module 406 includes code to preprocess the production log data to generate an exploration data set. In some implementations, the preprocessor module 406 includes code to preprocess the log data comprising using search engine result diversity to simulate randomized data collection. In some implementations, the preprocessor module 406 includes code to aggregate the exploration data by query, by action, by the probability of action and by reward values. In some examples, the estimator module 408 includes code to perform offline estimates of online metrics using the exploration data set. In some examples, the estimator module includes code to approximately match actions in the exploration data set using a predetermined number of higher-ranked results for each action.

In some examples, the evaluator module 410 includes code to calculate a delta metric score between a first ranker and a second ranker. In some implementations, the evaluator module 410 includes code to indicate a confidence level of the delta metric score. In implementations, the evaluator module 410 includes code to detect the ranking function is a preferred ranking function based on a comparison of online metrics with a baseline ranking function. The testing module 412 includes code to test the preferred ranking function on users online. For example, the preferred ranking function can be tested online through A/B tests, among other types of online evaluation. In some examples, an information retrieval system can executed actions based on the preferred ranking function in response to detecting that a quality of the preferred ranking function exceeds a threshold during a testing process. In some examples, a display module 414 can include to display the generated query results.

It is to be understood that any number of additional software components not shown in FIG. 4 can be included within the tangible, computer-readable storage media 400, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

Example 1

This example provides for an example system for offline evaluation of ranking functions. The example system includes a processor and a system memory including code to direct the processor. When executed this code can cause the processor to receive production log data, the processor to pre-process the production log data to generate an exploration data set. The code can also cause the processor to perform offline estimation of online metrics for ranking functions using the exploration data set. The code can also cause the processor to evaluate the proposed ranking function by comparing the estimated online metrics to a set of baseline metrics of a baseline ranking function and detecting that the estimated online metrics of the proposed ranking function exceed, are lower than, or are within a predetermined range of the baseline metrics. Alternatively, or in addition the code can further cause the processor to generate query results with the proposed ranking function as a test of the proposed ranking function. Alternatively, or in addition, the code can further cause the processor to display the generated query results. Alternatively, or in addition, the code can cause the processor to pre-process the production log data by simulating randomized data collection based on result diversity when generating the exploration data set. Alternatively, or in addition, the code can cause the processor to pre-process the production log data by aggregating the production log data by query, by action, by probability of action and by reward value. Alternatively, or in addition, the code can cause the processor to use approximate action matching of rankings to estimate online metrics. Alternatively, or in addition, the code can cause the processor to compare a predetermined number of higher-ranked results for each action generated by a respective ranking function. Alternatively, or in addition, the online metrics can include at least one of a click-through rate (CTR), a time to click on a search engine results page (SERP), and a mean reciprocal of click positions. Alternatively, or in addition, the online metrics comprising at least one of a click-through rate (CTR), a time to click on a search engine results page (SERP), and a mean reciprocal of click positions. Alternatively, or in addition, the preferred ranking function can be used to execute an action on an information retrieval system in response to detecting that a quality of the preferred ranking function exceeds a threshold during the test. Alternatively, or in addition, the action can include displaying a search engine results page (SERP) in response to a query.

Example 2

This example provides for an example method for offline evaluation of ranking function performance. The example method can include receiving production log data. The example method can also include pre-processing the production log data to generate an exploration data set. The example method can further include performing an offline estimation of online metrics using the exploration data set for a plurality of ranking functions. The example method can also further include comparing the plurality of ranking functions based on the estimated online metrics to generate comparison results. The example method can also include identifying one or more preferred ranking functions based on the comparison results. The example method can also further include generating query results with the preferred ranking function during a testing process. Alternatively, or in addition, the example method may include approximately matching actions in the exploration data set. Alternatively, or in addition, the example method may include approximately matching actions in the exploration data set by matching a predetermined number of higher-ranked results for each action. Alternatively, or in addition, the example method may include detecting whether a first ranking function from the plurality of ranking functions has a relevance score that is within a predetermined range of the relevance score of a second ranking function, higher than the predetermined range, or lower than the predetermined range. Alternatively, or in addition, the example method may include calculating a confidence score that indicates a level of certainty of the comparison results and displaying the confidence score with an associated comparison result. Alternatively, or in addition, the example method may include preprocessing the production log data further comprising using result diversity to simulate randomized data collection. Alternatively, or in addition, the example method may include preprocessing the production log data further comprising aggregating the production log data by query, by action, by probability of action and by reward value. Alternatively, or in addition, the example method may include sending the preferred ranking function to a server during the testing process. Alternatively, or in addition, the example method may include testing the preferred ranking function on users via the server during the testing process. Alternatively, or in addition, the example method may include displaying the comparison results. Alternatively, or in addition, the example method may include storing the comparison results. Alternatively, or in addition, the example method may include updating the comparison results.

Example 3

This example provides for one or more computer-readable storage medium for storing computer readable instructions that, when executed by one or more processing devices, instruct the offline evaluation of ranking function performance. The computer-readable medium includes instructions to receive production log data. The computer-readable medium also includes instructions to preprocess the production log data to generate an exploration data set. The computer-readable medium includes instructions to perform offline estimates of online metrics for a ranking function based at least in part on the exploration data set and an approximate action matching process. Further, the computer-readable medium includes instructions to detect that the ranking function is a preferred ranking function based on a comparison of the estimated online metrics with baseline ranking function metrics. The computer-readable medium also further includes instructions to execute an action on an information retrieval system based on the preferred ranking function in response to detecting that a quality of the preferred ranking function exceeds a threshold during a testing process. Alternatively, or in addition, the computer-readable medium may include instructions to calculate a delta metric score between the preferred ranking function and the baseline ranking function. Alternatively, or in addition, the computer-readable medium may include instructions to detect that the delta metric score indicates that the preferred ranking function has a higher estimated online metric than the online metric of the baseline ranking function. Alternatively, or in addition, the computer-readable medium may include instructions to aggregate the exploration data by query, by action, by the probability of action and by reward values. Alternatively, or in addition, the computer-readable medium may include instructions to display the results of the execution of the action on the information retrieval system. Alternatively, or in addition, the computer-readable medium may include instructions to update the results based on another preferred ranking function. Alternatively, or in addition, the computer-readable medium may include instructions to store the results of the execution of the action on the information retrieval system.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for offline evaluation of ranking functions, comprising a processor to:
   receive production log data and pre-process the production log data to generate an exploration data set, wherein the production log data comprises continuous updates of a ranking function associated with different actions for a same query issued by a same user in different impressions;
   perform offline estimation of online metrics for ranking functions using the exploration data set, wherein a proposed ranking function is to be received and tested offline prior to being tested online on users;
   evaluate the proposed ranking function by comparing the estimated online metrics to a set of baseline metrics of a baseline ranking function and detecting that the estimated online metrics of the proposed ranking function exceed, are lower than, or are within a predetermined range of the baseline metrics;
   detect that the proposed ranking function is a preferred ranking function having a higher detected metric score than the baseline ranking function based on a comparison of the estimated online metrics with the baseline metrics of the baseline ranking function;
   execute an action on an information retrieval system based on the preferred ranking function in response to detecting that a quality of the preferred ranking function exceeds a threshold; and
   display generated results from the information retrieval system.

2. The system of claim 1, wherein the processor is to pre-process the production log data by aggregating the production log data by query, by action, by probability of action and by reward value.

3. The system of claim 1, wherein the processor is to use approximate action matching of rankings to estimate online metrics.

4. The system of claim 3, wherein approximate action matching comprises comparing a predetermined number of higher-ranked results for each action generated by a respective ranking function.

5. The system of claim 1, the online metrics comprising at least one of a click-through rate (CTR), a time to click on a search engine results page (SERP), and a mean reciprocal of click positions.

6. The system of claim 1, the preferred ranking function to be used to execute an action on an information retrieval system in response to detecting that a quality of the preferred ranking function exceeds a threshold during the test.

7. The system of claim 6, the action comprising displaying a search engine results page (SERP) in response to a query.

8. The system of claim 1, wherein the processor is to generate query results with the proposed ranking function as a test of the proposed ranking function; and
   display the generated query results.

9. A method for offline evaluation of ranking function performance, the method comprising:
   receiving production log data;
   pre-processing the production log data to generate an exploration data set, wherein the production log data comprises continuous updates of a ranking function associated with different actions for a same query issued by a same user in different impressions;
   performing an offline estimation of online metrics using the exploration data set for a plurality of ranking functions, wherein a proposed ranking function is received and tested offline prior to being tested online on users;
   comparing the plurality of ranking functions based on the estimated online metrics to generate comparison results;
   identifying one or more preferred ranking functions having a higher detected metric score than the baseline ranking function based on the comparison results;
   generating query results with the preferred ranking function during a testing process; and
   displaying the generated query results.

10. The method of claim 9, further comprising approximately matching actions in the exploration data set.

11. The method of claim 10, further comprising approximately matching actions in the exploration data set by matching a predetermined number of higher-ranked results for each action.

12. The method of claim 9, further comprising detecting whether a first ranking function from the plurality of ranking functions has a relevance score that is within a predetermined range of the relevance score of a second ranking function, higher than the predetermined range, or lower than the predetermined range.

13. The method of claim 9, further comprising calculating a confidence score that indicates a level of certainty of the comparison results and displaying the confidence score with an associated comparison result.

14. The method of claim 9, preprocessing the production log data further comprising aggregating the production log data by query, by action, by probability of action and by reward value.

15. The method of claim 9, further comprising sending the preferred ranking function to a server during the testing process.

16. The method of claim 15, further comprising testing the preferred ranking function on users via the server during the testing process.

17. One or more computer-readable memory storage devices for storing computer readable instructions that, when executed by one or more processing devices, instruct the offline evaluation of ranking function performance, the computer-readable instructions comprising code to:
   receive production log data;
   preprocess the production log data to generate an exploration data set, wherein the production log data comprises continuous updates of a ranking function associated with different actions for a same query issued by a same user in different impressions;
   perform offline estimates of online metrics for a ranking function based at least in part on the exploration data set and an approximate action matching process, wherein a proposed ranking function is received and tested offline prior to being tested online on users;
   detect that the ranking function is a preferred ranking function having a higher detected metric score than the baseline ranking function based on a comparison of the estimated online metrics with baseline ranking function metrics;

execute an action on an information retrieval system based on the preferred ranking function in response to detecting that a quality of the preferred ranking function exceeds a threshold during a testing process; and display generated results from the information retrieval system.

18. The one or more computer-readable memory storage devices of claim 17, the code for the comparison of online metrics further comprising code to:

calculate a delta metric score between the preferred ranking function and the baseline ranking function; and detect that the delta metric score indicates that the preferred ranking function has a higher estimated online metric than the online metric of the baseline ranking function.

19. The system of claim 1, wherein a contextual bandit model is used to generate the exploration data set.

20. The system of claim 1, wherein the ranking function behavior comprises a changing feature of a query-document pair or an update of an engine index.

* * * * *